(No Model.)

W. J. RYAN & J. A. MURPHY.
ELASTIC TIRE FOR VEHICLE WHEELS.

No. 544,237. Patented Aug. 6, 1895.

Witnesses.
H. J. Clemons
W. H. Chapin

Inventors
William J. Ryan &
James A. Murphy
per Chapin &co- Attys

United States Patent Office.

WILLIAM J. RYAN AND JAMES A. MURPHY, OF HOLYOKE, MASSACHUSETTS, ASSIGNORS OF ONE-THIRD TO CHARLES H. MORGAN, OF SAME PLACE.

ELASTIC TIRE FOR VEHICLE-WHEELS.

SPECIFICATION forming part of Letters Patent No. 544,237, dated August 6, 1895.

Application filed November 3, 1894. Serial No. 527,826. (No model.)

*To all whom it may concern:*

Be it known that we, WILLIAM J. RYAN and JAMES A. MURPHY, citizens of the United States of America, residing at Holyoke, in the county of Hampden and State of Massachusetts, have invented new and useful Improvements in Elastic Tires for Vehicle-Wheels, of which the following is a specification.

This invention relates to tires for vehicle-wheels of the pneumatic class, the object being to produce in conjunction with the air-tube protective appliances at the tread side which will successfully resist the effects of punctures at such tread side of the tire, and which shall be so light and elastic as not to materially impair the resiliency and flexibility of the tire.

Figure 1:
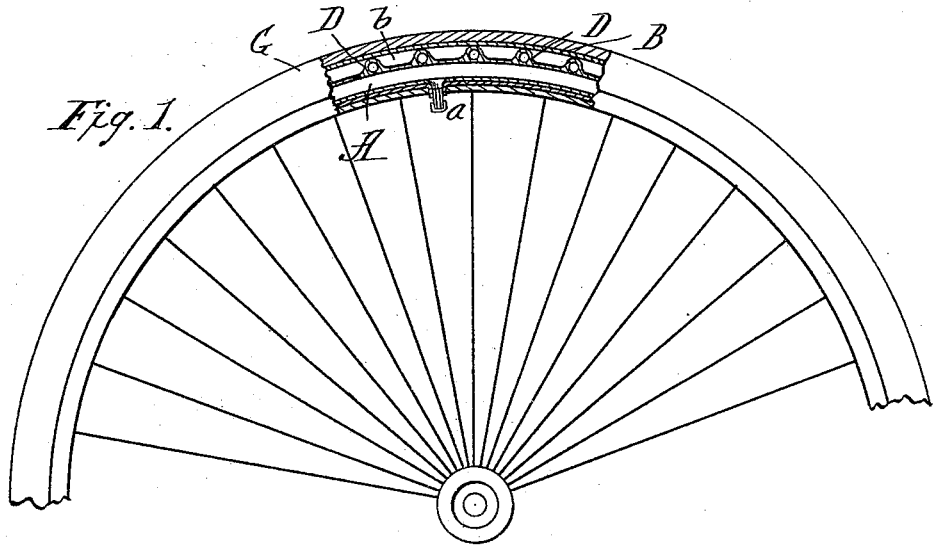
Figure 2:
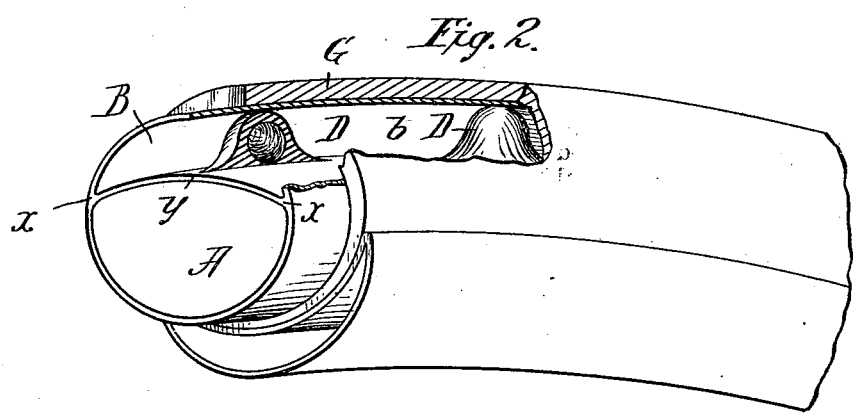

In the accompanying drawings, Figure 1 is a side view of a part of a wheel with a portion broken out, showing the rim and tire in longitudinal section. Fig. 2 is a sectional and perspective view, on a larger scale, more clearly showing some features of the tire constructions.

The tire of this invention comprises an air-tube A, with a suitable valved passage $a$, as usual, and an outlying flexible elastic sack B at the tread side of the air-tube, which is connected to the air-tube or integrally joined thereto at and continuously along the lateral sides thereof. There is, therefore, a dead-air space $b$ between the air-tube and the sack B, within which are placed, at suitable intervals, elastic mound-like protuberances D, to hold the sack distended and away from the air-tube, as seen in the drawings. The bases of the said mound-like protuberances are preferably cemented to the air-tube at the median longitudinal line thereof, so that they may not become displaced by creeping. The outer sack may be constituted merely by a strip of rubber having, while taut or under some tension, its edges cemented or otherwise permanently secured to the air-tube, the place of such junction being seen at $x$, Fig. 2, while again it is well within the province of workers in rubber goods to construct a tube of circular or other cross-sectional form with an integrally-formed diaphragm $y$, extending between its lateral sides, at one side of which is formed the space for the compressed air, while at the other side is the dead-air space, within which are placed and permanently secured the said protuberances. The said mounds or protuberances, in lieu of being secured to the external side of the wall $y$, might be secured to the internal side of the outer wall B; but in either case they constitute permanent parts of the tire as distinguished from an attachment to or appliance for the tire, which it is the province of this invention in part to avoid.

The tire, essentially composed of the inflatable air-tube A, with the outlying sack B and the intermediate distending protuberances D, may be secured in the rim and the mound-supported sack B directly may form the tread of the tire; or, if desired, an outer jacket or shoe, as seen at G, may overlie and be supplemental to the tire of the construction essentially as above specified; but the part G is by no means to be regarded as an essential feature of the tire, for in the tires for ordinary uses it will be omitted.

Manifestly any sharp object—as, for instance, a tack—in its penetration at the tread side of the tire would be unlikely to reach or penetrate the walls of the space for the compressed air.

Having thus described our invention, what we claim, and desire to secure by Letters Patent, is—

In a pneumatic tire for vehicle wheels, a tube of elastic rubber comprising internally between its lateral sides an attached wall or diaphragm of rubber between which and the tread part of the tube are included a series of elastic protuberances for holding the said tread part of the tube distended from the diaphragm, said protuberances being as a unity of one of said last named parts, and a valved passage through which to inflate the portion of the tube within said diaphragm, substantially as described.

WILLIAM J. RYAN.
JAMES A. MURPHY.

Witnesses:
WM. S. BELLOWS,
H. A. CHAPIN.